Nov. 1, 1960  C. T. BATTS ET AL  2,958,547
DETACHABLE MOUNTING FOR VALVE UNITS
Filed Aug. 9, 1954  4 Sheets-Sheet 1
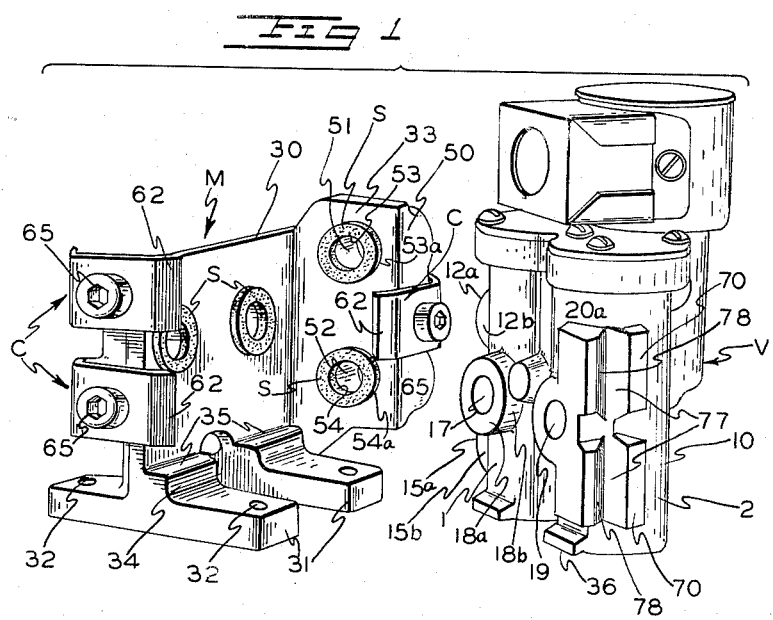
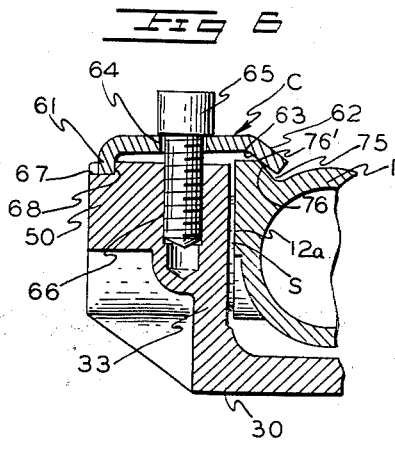
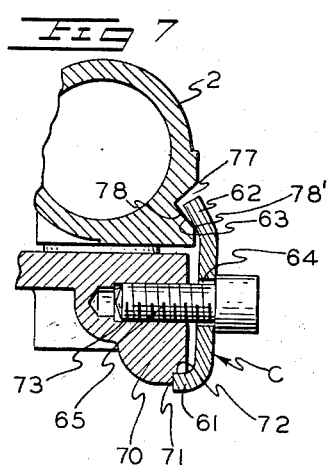
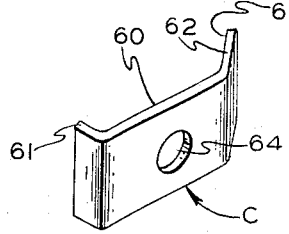
INVENTORS:
Carl T. Batts and
Paul A. Shaffer
BY Pecks & Pecks
ATTORNEYS

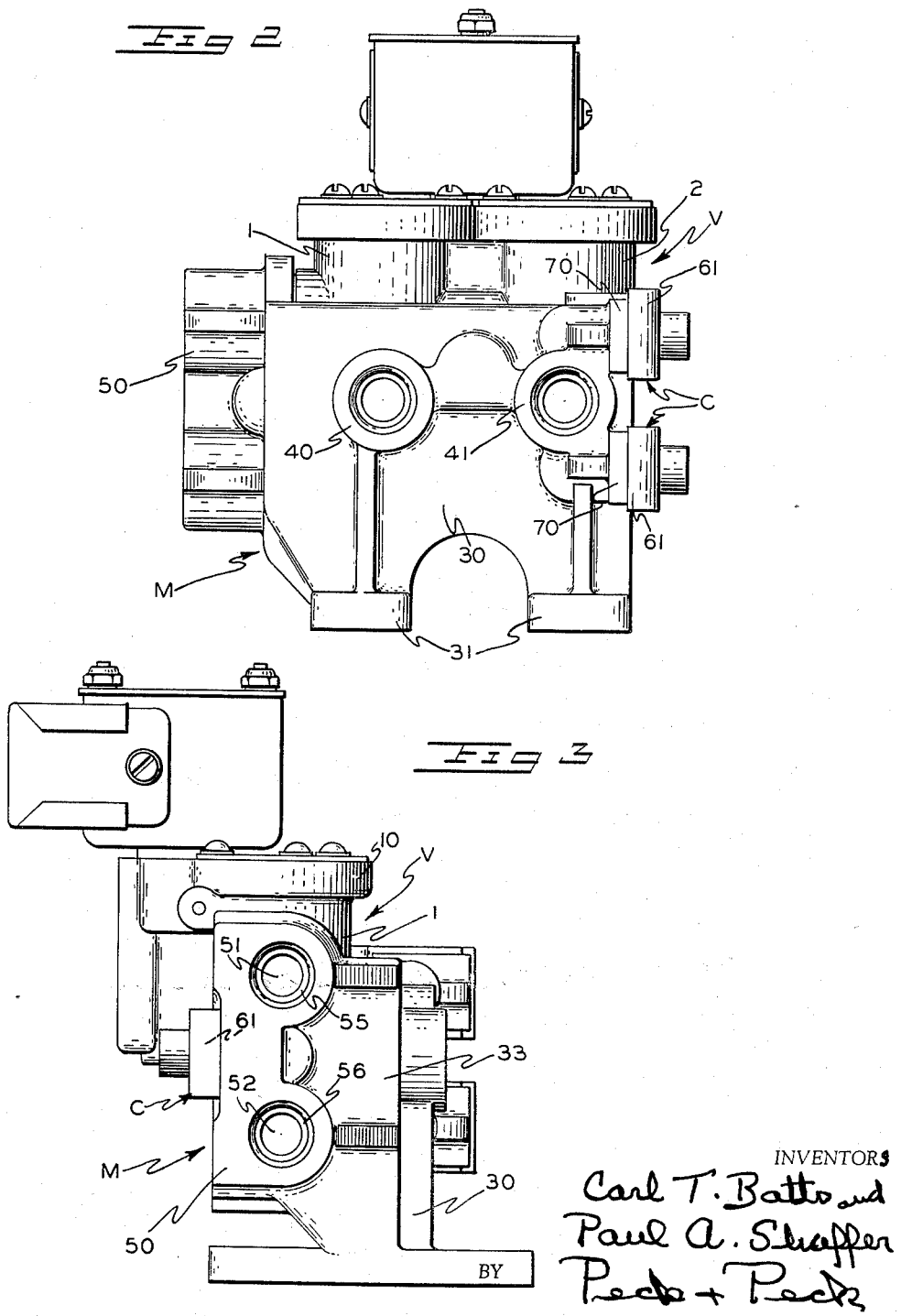

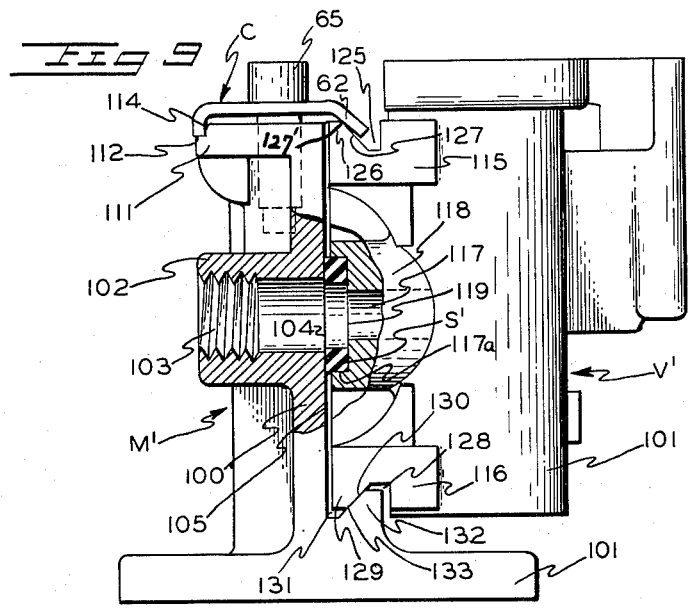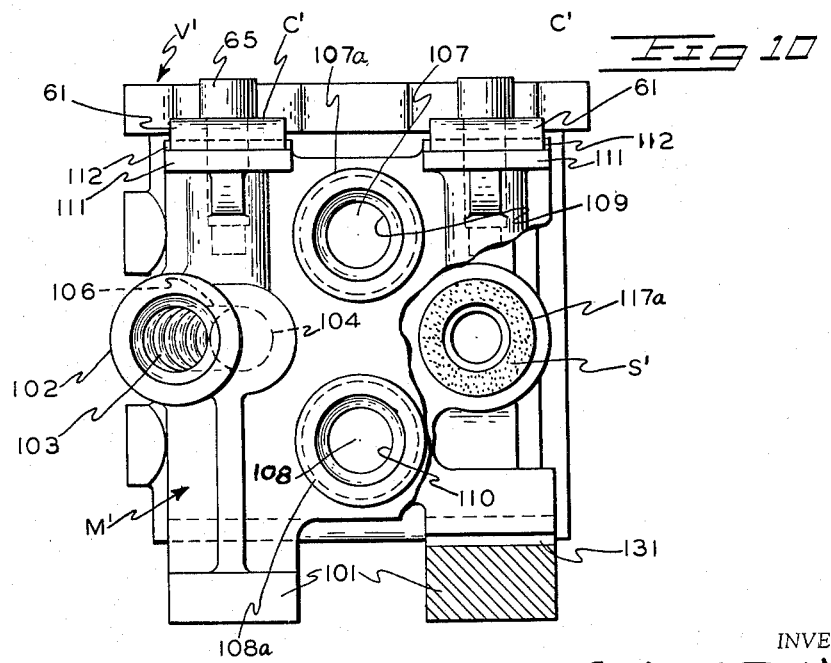

United States Patent Office 2,958,547
Patented Nov. 1, 1960

2,958,547

DETACHABLE MOUNTING FOR VALVE UNITS

Carl T. Batts, 2410 Ridgeway Road, San Marino 9, Calif., and Paul A. Shaffer, Alhambra, Calif.; said Shaffer assignor to said Batts Filed Aug. 9, 1954, Ser. No. 448,724

2 Claims. (Cl. 285—26)

The invention is directed to certain improvements in detachable mountings for valve units, and particularly to such units of the types utilized for controlling and operating fluid pressure actuated components, such as cylinder and piston units; and the nature and objects of the invention will be readily recognized and understood by those skilled in the arts involved in the light of the following explanation and detailed description of the accompanying drawings illustrating what we now believe to be the preferred embodiments or mechanical expressions of our invention, from among various other forms, embodiments, adaptations, designs, constructions and combinations of which our invention is capable within the broad spirit and scope thereof as defined by the claims hereto appended.

Various types of valve units are employed for controlling the actuation of fluid pressure operated components such as the cylinder and piston units used for controlling the operation of various types of machines, such as riveting, welding and the like machines. Such a valve unit must be connected between a pressure fluid supply system and the cylinder and piston unit or other component of a machine which is to be controlled and operated thereby. The controlling valve unit is usually mounted at or adjacent the cylinder and piston unit of the machine in order that minimum length pressure fluid supply and exhaust or return lines may be utilized from the valve unit. It is highly desirable in the event of the failure of one of these controlling valve units to be able to remove such unit and replace it with a new unit quickly and easily in order to avoid maintaining the machine operated and controlled thereby out of production for any extended period of time. And where the valve unit is one of a number of such units used in an assembly line of machines speed of removal and replacement of a malfunctioning valve unit is essential to prevent serious interruption to the flow of work through the assembly line.

The arc has provided certain types of these controlling valve units with so called sub-bases which are arranged for permanent connection with the pressure fluid supply system lines and with the inlet and exhaust lines from the valve to the component controlled thereby, to permit of the removal and replacement of the valve unit without the necessity of disconnecting and connecting the several pressure fluid lines from and to the sub-base. However, in such arrangements of valve units having sub-bases now available on the market, the design and construction of the units and the sub-bases therefor is cumbersome and wasteful of material and requires complicated sets of cored castings all of which makes the units costly in manufacture and expensive to the user. In addition, such detachable mounting of a unit on a sub-base requires a plurality of fastening members of types which make the detachment and attachment of a valve unit a time-consuming operation. Further, due to the design and construction of the valve unit and sub-base with the plurality of fastening members therefor, difficulties are encountered in maintaining effective, leak-proof sealing between the communicating sets of ports of the valve unit and its sub-base, particularly under the operating conditions encountered with pressure fluids in the higher pressure ranges.

It is a primary object of our present invention to overcome or reduce the disadvantages resulting from the difficulties encountered with such detachable valve units and the mounting sub-bases therefor, by providing a type of mounting structure of a relatively simple design and construction of relatively low cost to manufacture and by which the bulk of the mounting structure may be reduced and the necessity for complicated and expensive cored parts may be eliminated, and with which effective sealing between the communicating ports of the mounting structure and a valve unit attached in operative position thereon will be provided under all conditions of operation and use.

Another object is to provide such a mounting structure and detachable valve unit with quick detachable attaching means by which a valve unit may be attached in operative position on and detached and removed from the mounting structure in a minimum of time by simple manual manipulations with the use of commonly available conventional tools.

A further object is to provide the valve unit attaching means as of the quick-detachable, self-adjusting camming clamp type to insure automatically the proper tight and rigid attachment of a valve unit in operative position on and to the mounting structure under all normal conditions of wear encountered in use.

Another object is to provide a ported mounting structure for the detachable mounting thereon of a ported pressure fluid controlling valve unit by which effective individual and independent sealing is automatically obtained and maintained between the respective sets of communicating ports of the valve unit and the mounting structure.

A further object is to provide an arrangement of independent resilient, compressible type sealing members between the respective sets of communicating ports by which such sealing members form the sole areas of contact between the opposing areas of the valve unit and the mounting structure.

And a further object is to provide such an arrangement of resilient or compressible sealing members by which quick-release fastening or clamping means may be effectively used due to the low forces required to efficiently secure or clamp the valve unit to the mounting structure in the required leak-proof, bubble-tight relation at all port connections.

Another object is to provide a design and construction of a mounting structure component and a pressure fluid valve unit component for detachable mounting thereon in which portions are provided on one of said components for camming and clamping engagement by clamp members of the type for quick clamping and release which are normally permanently mounted on and carried by the other of said components.

A further object is to provide a design and construction of a mounting structure for normal permanent connection to the fluid lines to and from a pressure fluid valve unit and of such a valve unit for detachable mounting on such structure, by which clamping members are carried by the mounting structure for releasable engagement with the valve unit to detachably clamp the valve unit in operative position on the mounting structure.

A further object is to provide a design and construction of a panel type mounting structure for normal permanent connection to the pressure fluid lines to and from a pressure fluid control valve unit of the type for normal mounting in an upright position, by which such a valve unit may be detachably mounted on the mounting structure in its normal upright position in operative, sealed communication with the pressure fluid lines which are permanently connected with the mounting structure.

A further object is to provide such a panel type mounting structure constructed to provide an upright panel wall forming portion having ports therein opening therethrough at the inner and outer sides thereof for detachable sealing connection at the inner side of the panel wall forming portion with a pressure fluid valve unit detachably secured on the mounting structure and for normally permanent connection at the outer side thereof with the pressure fluid lines to and from the valve unit.

And another object and feature of the invention resides in providing such a panel type mounting structure and valve unit with clamping members of the camming type adapted for quick clamping and releasing operation located in readily accessible positions thereon for rigidly releasably clamping the valve unit in operative position on the panel mounting structure.

With the foregoing general objects, features and results in view, as well as certain others which will be readily recognized from the following detailed description, my invention consists in certain novel features in design and construction of parts and elements and in the combinations and sub-combinations thereof, all as will be more fully referred to and specified hereinafter.

Referring to the accompanying drawings in which similar reference characters refer to corresponding parts and elements throughout the several figures thereof:

Fig. 1 is a perspective view of the panel type mounting structure and valve unit of our invention showing the valve unit detached from the mounting structure.

Fig. 2 is a side elevation of the mounting structure and valve unit with the latter in mounted, sealed attachment on the mounting structure.

Fig. 3 is an end elevation of the mounted and attached valve unit and mounting structure of Fig. 2.

Fig. 6 is a detail fragmentary horizontal section taken as on the line 6—6 of Fig. 2.

Fig. 7 is a detail fragmentary horizontal section taken as on the line 7—7 of Fig. 2.

Fig. 8 is a perspective view of one of the wedging type clamping members of our invention.

Fig. 9 is a view partly in end elevation and partly in vertical section of a modified form of panel mounting structure and valve unit of our invention.

Fig. 10 is a view of the modified form of Fig. 9 partly in front elevation with a portion of the panel wall broken away to show a port and sealing ring member of the valve unit.

Figure 4:
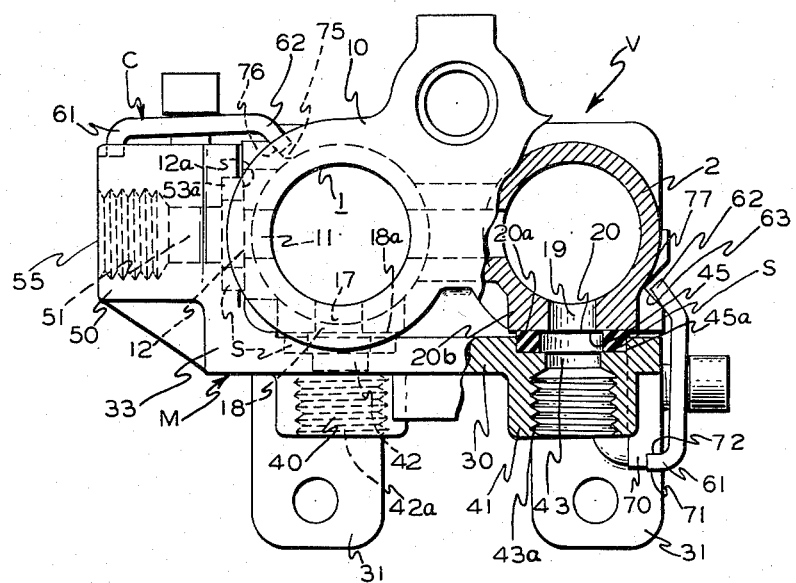
Fig. 4 is a view of the attached and assembled mounting structure and valve unit, partly in top plan and partly in horizontal section.
Figure 5:
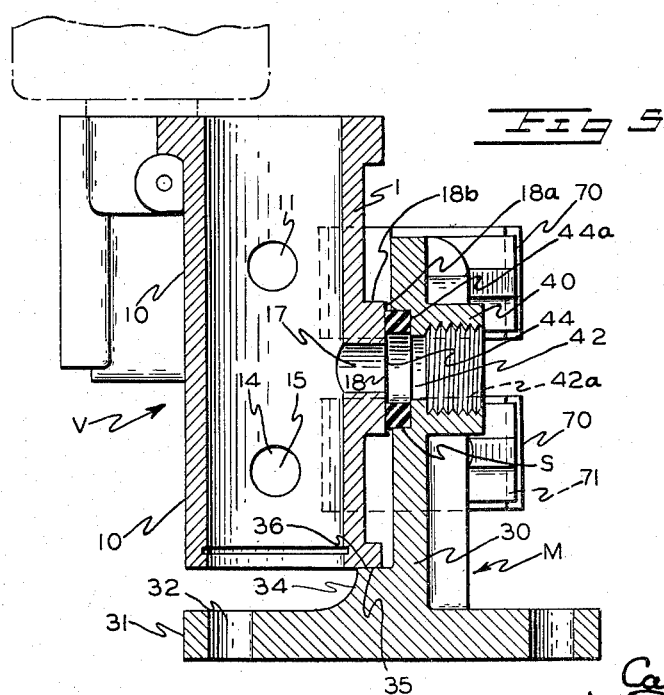
Fig. 5 is a view in vertical transverse section taken as on the line 5—5 of Fig. 4.

In a preferred structural and functional expression of my invention as disclosed in Fig. 1 of the accompanying drawings, there is provided a panel type mounting structure designated generally by the reference character M, for a pressure fluid control valve unit designated generally by the reference character V. The valve unit V is adapted to be mounted and detachably clamped in operative position on the mounting structure M. The mounting structure M is adapted to be normally permanently connected with suitable pressure fluid pipe connections to a pressure fluid supply system and to be normally permanently connected with the pressure fluid pipe connections for operatively coupling the valve unit with any desired pressure fluid actuated component to be controlled from and operated by the valve unit. In accordance with my invention the valve unit V is mounted on and is detachably clamped in operative position to the mounting structure M through the medium of camming clamp members C of a type for manual operation for quick clamping and quick release to thereby permit the valve unit to be very quickly removed from and replaced in operative position attached to the mounting structure.

It so happens that the form of panel type mounting structure M of the invention selected as an example for illustrative purposes herein is designed and constructed to receive and mount a four-way type of valve unit such as the valve unit V, which will efficiently operate in any position but is preferably mounted in the upright position shown in the drawings. However, it is to be understood that my invention is not limited to adaptations for detachably mounting only valve units of the four-way type, as it is contemplated and intended that the mounting structure may be modified to mount and receive valve units of the three-way or other types without departing from the inventive features as presented by and incorporated in the mounting structure M and the valve unit V of the selected example hereof.

As the valve unit V is of a general type well known and familiar in the art, it is deemed unnecessary to make a detailed disclosure of either the construction or the operation thereof herein. Such four-way valve units are generally used for the control and operation of double-acting cylinder and piston components by alternately supplying pressure fluid to one end while exhausting fluid from the opposite end of the cylinder of such a component. The operation of such a four-way valve unit is usually through the medium of a pilot valve or the like which may be operated through its cycle manually, by power means, such as a solenoid, or in any other desired or suitable manner.

For example, the valve unit V of this example is of the type normally mounted in an upright position, although not limited to mounting and operation in such position. The valve unit V includes a main body in the form of a casing 10 which is designed and formed to provide the spaced, parallel cylinders 1 and 2 for operatively receiving therein suitable valve members (not shown) for cycling the pressure fluid through the valve unit. The casing 10 is formed to provide suitable valve seats and communicating passages therewithin (not shown) between the valve members and the cylinders as will be understood by those familiar with four-way types of valve units. At one end of the casing 10 the cylinder 1 is formed with an inlet passage 11 extending radially through the side wall of and opening into the cylinder adjacent the upper end thereof with this inlet passage at its outer end terminating in a pressure fluid inlet port 12 opening through the outer surrounding annular sealing surface 12a of a projecting boss portion 12b of casing 10. Spaced axially along cylinder 1 from the pressure fluid inlet passage 11 a fluid exhaust passage 14 is provided extending radially through the side wall of the cylinder in communication with the interior thereof and parallel with passage 11 in position located adjacent the lower end of the cylinder. The fluid exhaust passage 14 terminates at its outer end in the fluid exhaust port 15 opening through the surrounding annular sealing surface 15a of a projecting boss portion 15b on the outer side surface of the cylinder 1. The surfaces 12a and 15a of the cylinder 1 through which the inlet and exhaust ports 12 and 15 open are formed by precision machining and finishing to provide truly planar seating and sealing surfaces for abutting and sealing engagement against facing surfaces of suitable sealing members on the mounting structure M, as will be hereinafter described and explained.

At one side of the casing 10, the cylinder 1 is provided with an inlet-outlet passage 17 extending radially through the side wall thereof opening into the interior of the cylinder in a position located intermediate the upper and lower ends of the cylinder spaced approximately 90° around the cylinder from the inlet and exhaust passages 11 and 14. The inlet-outlet passage 17 terminates at its outer end in a port 18 opening through the surrounding annular outer side surface 18a of a projecting boss portion 18b on the cylinder 1. A similar inlet-outlet passage 19 is located at the same side of casing 10 as the passage 17 of cylinder 1 and extends radially through the side wall of cylinder 2 intermediate the upper and lower ends of the cylinder with the outer end of this passage 19 terminating in a port 20 opening through the surrounding annular outer side surface 20a of a projecting boss portion 20b of cylinder 2. The passages 17 and 19 are positioned parallel with each other and, in this example, with their axes disposed normal to the axes of the parallel inlet and exhaust passages 11 and 14 of the cylinder 1, so that with the valve unit V mounted in its normal upright position, the cylinders 1 and 2 are in vertically disposed position with the passages 11, 14, 17 and 19 in horizontally disposed positions. The outer side surface 18a of cylinder 1 through which the port 18 of inlet-outlet passage 17 opens is precisely machined to provide a truly planar seating and sealing surface for abutting and sealing engagement with a corresponding surface provided by a sealing member on the mounting structure M as will be later referred to and described. Similarly the outer side surface 20a of cylinder 2 surrounding the inlet-outlet port 20 is precisely machined to provide a truly planar abutting and sealing surface which is adapted for sealing engagement against a corresponding surface provided by a sealing member on the mounting structure M when the valve unit V is in mounted operative position rigidly clamped and attached to such mounting structure, as will be described hereinafter.

In the normal functioning of the valve unit V, as will be understood by those familiar with these known types of four-way valve units, pressure fluid is admitted to the cylinders 1 and 2 through the inlet passage 11 while the exhaust passage 14 is also in communication with the cylinders 1 and 2. In one position of the valve members and the cooperating seats and passages (not shown) of cylinder 1 is opened to the pressure fluid inlet passage 11 and closed to the exhaust passage 14, while the inlet-outlet passage 19 of cylinder 2 is closed to inlet passage 11 and opened to exhaust passage 14. In the reverse or alternate position inlet-outlet passage 17 is closed to inlet passage 11 and opened to exhaust passage 14, while inlet-outlet passage 19 is opened to inlet passage 11 and closed to exhaust passage 14. Thus, when passages 17 and 19 and their respective ports 18 and 20 are connected with the opposite ends of a double-acting cylinder and piston component, the normal operation of valve unit V will effect reciprocation of the double-acting piston in the cylinder of such a component by alternately supplying pressure fluid to and exhausting fluid from the opposite ends of the cylinder.

In the panel type mounting structure M in the form of Fig. 1, the structure includes a side panel forming wall 30 which in the normal upright mounted position of the structure M provides an upright or vertically positioned wall having an attachment base provided by the spaced mounting feet or pedestals 31 disposed in positions extending transversely thereacross at the lower side or edge thereof. In this instance the side wall panel 30 is positioned in a plane approximately normal to the plane of the pedestals 31. The mounting pedestals 31 are preferably cast or otherwise formed integral with the panel wall 30 and are each provided with the bores 32 therethrough for receiving suitable bolts or other fastening members by which the mounting structure M may be attached in position on a suitable bracket or other support (not shown) which is preferably located adjacent to the pressure fluid actuated component which is to be operated and controlled by a valve unit V detachably secured on the mounting structure M. At one end of the panel wall 30 there is provided a second upright or vertical end panel wall 33 which extends laterally inwardly from one side of panel wall 30, preferably as in the example hereof, at substantially right angles to the latter wall, although my invention is not limited to any particular angle between panel walls 30 and 33. Preferably the end panel wall 33 is formed integral with the side panel wall 30 and has a width or depth less than panel wall 30 to extend from the upper edge of the latter panel wall to a location spaced above the lower side of wall 30 and above the mounting feet or pedestals 31.

In the specific example hereof the upright panel wall 30 is formed of increased thickness at its lower side across each of the pedestals 31 to provide the inwardly or rearwardly extending footings or bases 34 for mounting and supporting thereon the valve unit V when the latter is in its operative position attached to the mounting structure M. For this purpose the upper sides of the bases 34 are formed to provide the substantially planar seats 35 thereacross which with the mounting structure M in normal upright position are disposed horizontally and preferably, although not essentially, lie substantially in the same plane. With the valve unit V in operative mounted position on the mounting structure M the under or lower side of body or casing 10 provides a substantially planar seating surface or surfaces 36 thereon and thereacross adjacent the side thereof at the panel wall 30 which is received and seats upon the seats 35 of the bases 34.

The panel walls 30 and 33 of the mounting structure M are provided with suitable passages and ports for sealed communication with the ports 12, 15, 18 and 20 of the valve unit V, and for permanent connection with the pressure fluid pipe connections from a pressure fluid supply system to the valve unit and from the valve unit to the pressure fluid actuated component which is to be operated thereby. To this end the panel wall 30 is provided at the outer side thereof intermediate its upper and lower sides with the spaced outwardly extending bosses 40 and 41 which may be formed or cast integrally with the panel wall. Bores are provided axially through the bosses 40 and 41 and are extended through the panel wall 30 to provide the pressure fluid flow passages 42 and 43, respectively, opening through the outer ends of the bosses and opening through the inner side of the panel wall. The lengths of the passages 42 and 43 through the bosses 40 and 41 are constituted by tapped counterbores 42a and 43a of enlarged diameter relative to the lengths of the passages through the panel wall 30 for threaded connection thereinto of the pipe connections to a pressure fluid supply system with which the valve unit V is to be coupled. Passage 42 terminates at its inner end in a port 44 opening through the inner side surface of panel 30 while passage 43 terminates at its inner end in a port 45 opening through the inner side surface of the panel. A counterbore 44a is provided in the panel wall 30 at the inner end of passage 42 surrounding the port 44 to provide an annular recess for mounting and containing a resilient, compressible material sealing ring member S which has an internal diameter substantially equal to the internal diameter of passage 42 and thus forms a continuation of that passage. A counterbore 45a is provided in the inner side of panel wall 30 concentric with passage 43 to provide an annular recess for mounting and containing therein a sealing ring member S similar to and interchangeable with the sealing member S hereinbefore described as mounted in counterbore 44a at the inner end of passage 42. The sealing ring member S which is mounted in the recess provided by counterbore 45a has an internal diameter substantially equal to the diameter of passage 43 and thus forms a continuation of that passage. The passages 42 and 43 have their respective ports 44 and 45 formed by the sealing members S opening through the inner side of panel wall 30 in axial alignment with the passages 17 and 19, respectively, in the valve unit V when the latter is in mounted operative position on the mounting structure M with the ports 18 and 19 of these passages aligned with and opening into the ports 44 and 45, respectively, in the panel wall 30.

The sealing ring members S have a depth or axial thickness slightly greater than the depths of the counterbores 44a and 45a in which they are mounted so that these members S project a slight distance outwardly beyond the inner surface of the panel wall 30. In this particular example such projection may be taken to be of the order of 1/32″. The sealing members S are formed of a suitable material such as a rubber, rubber composition or equivalent material having characteristics such that when engaged by the sealing surfaces 18a and 20a surrounding the ports 18 and 20 of the valve unit V and placed under the required forces to effectively clamp the valve unit to the mounting structure, with the latter in mounted clamped position each sealing member will be compressed by such forces only to the extent of a few thousandths of an inch. Thus the facing metal surfaces of panel wall 30 and the valve unit V will be maintained spaced apart with the only areas of sealing contact being between the annular exposed inner surfaces of the sealing ring members S and the metal sealing surfaces 18a and 20a, respectively, with such areas completely independent of and separate from each other.

The end panel wall 33 of the mounting structure M is formed of increased thickness for substantially its full height at the portion thereof along and adjacent the inner end edge of the wall to thereby provide a coupling block 50 which is preferably formed integral with wall 33. Vertically spaced bores are provided through the end panel wall 33 which open through the inner side thereof to provide passages 51 and 52 having the ports 53 and 54 in and opening through the inner surface of the panel wall. These passages 51 and 52 are positioned intermediate the width of the panel wall 33 and extend outwardly therethrough to terminate at their outer ends in the openings 55 and 56 with the bores being tapped a distance inwardly from such openings for threaded connection with suitable pressure fluid pipes. In this example the upper passage 51 through the panel wall 30 and coupling block 50 thereof provides the pressure fluid inlet passage for sealed connection with the inlet port 11 of the cylinder 1 of the valve unit V. The passage 52 which is spaced below the inlet passage 51 provides an exhaust passage for sealed connection with the exhaust port 14 in the side wall of cylinder 1 of the valve unit V.

A counterbore 53a is provided in the inner side of end panel wall 33 concentric with and surrounding passage 51 to thereby provide an annular recess for receiving and mounting therein a sealing ring member S similar to the sealing ring members S heretofore referred to and described. A similar counterbore 54a is formed in the inner side of end panel wall 33 surrounding and concentric with the port 54 of the passage 52. A sealing ring member S is mounted and contained in the annular recess formed by the counterbore 54a in a manner and for the purpose previously referred to in connection with these sealing ring members S. In each instance the sealing rings S surrounding the ports 53 and 54 project a slight distance of the order of 1/32″ outwardly beyond the inner surface of end wall 33 for engagement by the annular sealing surfaces 12a and 15a surrounding the ports 12 and 15 in the end wall of the casing 10 of the valve unit V. With the valve unit in mounted position on the mounting base structure M clamped and secured thereon, the sealing ring members S at the ports 53 and 54 are only compressed to the extent of a few thousandths of an inch so that the facing metal surfaces of the end panel wall 33 and the valve unit casing are maintained spaced apart and out of contact so that the only areas of contact and engagement between the valve unit and the end panel wall 33 are the engaged sealing ring members S and the sealing surfaces 12a and 15a.

The valve unit V is mounted on and attached to the mounting structure M in position with the inlet port 12 and the exhaust port 15 of cylinder 1 of the valve unit in alignment and communication with the ports 53 and 54, respectively, opening through the sealing ring members S at the inner side surface of end panel wall 33 and with the inlet-outlet ports 18 and 20 through the side walls of the cylinders 1 and 2 of the valve unit aligned and in communication with the inlet-outlet ports 44 and 45 through the sealing ring members S at the inner side of the panel wall 30. In such mounted position, the sealing surfaces 12a and 15a surrounding ports 12 and 15 of the valve unit V are engaged against the sealing ring members S which surround the ports 53 and 54 of end panel wall 33, and the sealing surfaces 18a and 20a surrounding ports 18 and 20 of the valve unit are engaged against the sealing members S which define the ports 44 and 45 of the side panel wall 30 of the mounting structure M. In this manner passages 11 and 12 of valve unit V are placed in sealed communication with passages 51 and 52, respectively, in the end panel wall 33 and passages 17 and 19 are placed in sealed communication with passages 42 and 43, respectively, in the side panel wall 30.

In accordance with our present invention we releasably clamp and rigidly attach the valve unit V in its foregoing operative position on the mounting structure M through the medium of camming-type clamping members C of the type capable of rapid operation to clamped and to released positions, while mounting such clamping members in readily accessible positions and providing them with simple, quick operating elements which can be manually operated by the use of commonly available conventional tools. In carrying out these features of the combination of the invention in the particular example hereof we mount these clamping members C and their operating elements on the panel walls of the mounting structure M and provide grooves in the casing 10 of the valve unit V for receiving and to form portions of the valve unit for camming and clamping engagement by the clamping members.

In this instance the valve unit V is clamped in its rigidly secured operative position by an arrangement of the clamping members C by which the valve unit is engaged at opposite ends thereof and is cammed to its operatively mounted, rigidly seated position by forces applied thereto in directions toward panel wall 30 and toward panel wall 33, respectively. In the forms thereof expressed by the present example clamping members C are provided on the outer free side of the panel wall 33 and its coupling block 50 and at the outer free end of the panel wall 30.

The clamping members C are identical as used in this example of the invention, and each comprises a bar or strip 60 of a suitable material, such as a spring steel, to provide a substantially rigid, non-yielding body member. Each bar or strip 60 is bent up at one end to provide a laterally disposed anchor flange 61 transversely thereacross and at the opposite end is bent up to provide an angularly disposed camming and clamping flange 62 disposed transversely thereacross and extending laterally at an angle to the bar or strip member 60. This camming flange member 62 at one end of each clamping member C is bent up to angularly extend laterally from the bar 60 at the same side thereof as the anchor flange 61 and provides at that side the wedging or camming surface 63 on the inner side thereof. Each clamping member C formed of the bar or body member 60, anchor flange 61 and camming flange 62 is provided with a bore 64 transversely therethrough at a location thereon intermediate the opposite ends thereof for receiving a clamp operating member in the form of a cap screw 65, which may be, as in this instance, of the well known socket type, for mounting and operation in a manner to be hereinafter described.

In the selected arrangement of the example hereof, one clamping member C is provided on the outer free side of the panel wall 33 and coupling block 50 while two (2) clamping members C are provided at the outer free end of the panel wall 30, that is the end thereof opposite panel wall 33. The clamping member C carried by the outer free side of panel wall 33 and block 50 is normally permanently mounted thereon in position extending transversely thereacross and outwardly a distance beyond the inner side of wall 33, by means of a cap screw 65 which extends loosely through the bore 64 in the bar body 60 and is threaded into a tapped bore 66 provided in the panel wall 33 and block 50. Thus positioned the anchor flange 61 of clamping member C is seated in a recess 67 formed in the outer side of block 50 which provides a shoulder 68 against which anchor flange 61 is engaged and by which the clamp member C is constrained and anchored against movement longitudinally and transversely inwardly of and relative to and across the block 50 and wall 33. With the anchor flange seated in its recess 67 the camming flange member 62 and the opposite end of the bar body 60 of clamping member C are located spaced a distance inwardly from wall 33 in position with the camming flange 62 thereof inclined inwardly toward panel wall 30 and the valve unit V when the latter is in mounted position on the mounting structure M.

The panel wall 30 at the outer end thereof opposite panel wall 33 is provided with the spaced mounting blocks 70 which may be formed or cast integral therewith and which are spaced apart transversely, that is, vertically in the normal upright position of mounting structure M, and which extend laterally outwardly from the outer side of wall 30. Each of these mounting blocks 70 is provided with a recess 71 providing an abutment or anchor shoulder 72 disposed vertically thereacross with the mounting structure in its normal upright position. Each mounting block 70 is provided with a tapped bore 73 extending thereinto and opening through the outer side thereof in position intermediate the anchor shoulder 72 and the inner side of panel wall 30. A cap screw 65 is provided for each clamping member C and is threaded into the tapped bore 73 of the mounting block on which the clamping member is mounted. A clamping member C is mounted on each mounting block 70 in position with its anchor flange 61 engaged in the anchor recess 71 in the block with the bar body 60 of the clamping member in position extending transversely inwardly across the outer side of the block and the outer edge of panel wall 30 and with the camming flange member 62 thereof located in position spaced a distance inwardly from the inner side of panel wall 30 and inclined in a direction inwardly toward the panel wall 33 and the valve unit V when in mounted position on the mounting structure M. Thus, each clamping member C is positioned on a mounting block 70 and constrained and anchored by the anchor flange 61 against movement longitudinally and transversely inwardly of and relative to and across block 70 and panel wall 30.

An axially disposed groove 75 is provided in the side wall of cylinder 1 of casing 10 opposite the side thereof at panel wall 30 and in a location to receive therein the camming flange 62 of the clamping member C that is mounted on panel wall 33 and its coupling block 50. This groove 75 provides a surface 76 on casing 10 that is inclined outwardly toward and rearwardly relative to end panel wall 33, with this surface 76 in this instance being at an angle of inclination of approximately 45°, although such angle is in no sense critical to our present invention. The groove 75 receives therein the camming flange 62 of the clamping member C on panel wall 33. The surface 76 formed by groove 75 provides the outer edge portion 76' therealong adopted to be engaged by the camming surface 63 of flange 62 of the above identified clamping member C. At the opposite end of the valve unit body or casing 10 adjacent the panel wall 30 there is provided a groove or grooves 77 disposed axially relative to the cylinder 2 in the side wall of the casing 10. These grooves 77 are located in the side wall of cylinder 2 opposite and receive therein the camming flanges 62 of the clamping members C which are mounted on the blocks 70 and panel wall 30. The groove 77 is formed to provide a surface 78 which is inclined outwardly in a direction toward the outer free end of panel wall 30 at an angle of inclination in this example of approximately 45°. Surface 78 provides the outer edge 78' therealong. In clamping positions the camming surfaces 63 of the clamping members C are slidably engaged against the edge surface 78' provided by the dovetail groove 77 with the clamping flanges 62 of the clamping members C received in the groove.

With the cap screws 65 of the several clamping members C loosened sufficiently by unscrewing them to thereby loosen the clamping members to permit of positioning the valve unit V on the mounting structure, as hereinbefore explained, the camming flange 62 of clamping member C on panel wall 33 is positioned in the groove 75 in casing 10 in wedging camming engagement with the edge surface 76' provided by that groove, and the camming flanges 62 of the clamping members C mounted on the outer end of panel wall 30 are positioned in the grooves 77 in casing 10 in slidable camming engagement with the edge surfaces 78' provided by the grooves 77. It is then only necessary to rapidly tighten up on the cap screws 65 with the heads of these screws bearing against the outer sides of the bar bodies 60 of the clamping members to thereby cam and wedge the valve unit V into rigidly secured position against the inner sides of the panel walls 30 and 33. With the clamping members C anchored by their respective anchor flanges 61 it will be seen that inward displacement under pressure of the clamping members by the heads of the cap screws 65 engaged against the outer sides thereof will, in the case of clamping member C on panel wall 33, wedge or cam valve unit V inwardly into position tightly secured against the inner side of panel wall 33, while inward displacement under pressure of the clamping members C mounted on panel wall 30 will, through the camming engagement of flanges 62 against the camming surfaces 78' of grooves 77, force and draw valve unit V inwardly into position with the metal sealing surfaces 12a, 15a, 18a, and 20a tightly engaged against the sealing ring members S, respectively, on the end panel wall 33 and the side panel wall 30 of the mounting structure M.

While in the preferred form of the disclosed embodiment of our invention, as hereinabove described, the mounting blocks 70 are recessed as at 71 to provide an abutment or anchor shoulder 72 for the anchor flange 61 of a clamp C, it is to be understood that our invention is not limited in all respects to such specific construction, as a bolt or cap screw of the dimensions and strength which would normally be employed, such as the cap screws 65 of the illustrated example, will alone provide far more than sufficient strength to support the load imposed by the camming action of a clamp C when the cap screw is threaded inwardly to secure the face of the casing to the panel wall.

It will also be evident that it is not essential to the effective use of the camming clamps C of our present invention in all adaptations thereof to provide the clamps with the anchor flanges 61, such as shown in the disclosed embodiment of the invention. It is to be noted, however, that such anchor flanges 61, turned inwardly as they are with respect to the bodies of the clamps at the outer ends thereof, serve to make the clamps more adjustable for camming action even in the absence of and without association with anchor shoulders 72. It is recognized that even if the outer ends of the clamps C are left unformed and allowed merely to rest on the flat surfaces of the mounting blocks 70, the camming action of the clamps C will still be effective.

In the embodiment of the invention herein illustrated as a preferred form thereof, a casing groove 75 is provided having a sloping surface 76, which latter surface makes no substantial or essential contribution to the camming action effected by the clamps C. As normally or conventionally a casing of the type disclosed in the example embodiment of the invention would be formed of cast material, such as bronze, a V-type groove milled in the edge of such a cast casing adjoining the mounting face thereof provides a much stronger supporting surface for the camming end of the clamp than would a straight-sided groove or recess having a supporting surface substantially parallel to the mounting face of the casing. Hence, attention is directed to the fact that except for the question of material strength, a straight-sided recess will be just as effective in producing the camming action as the V-type groove illustrated, and the valve unit V will be drawn just as surely into tight engagement with the panel wall of the mounting structure M with such a straight-sided recess.

With the valve unit V thus cammed and rigidly clamped into position on the mounting structure M, the annular metal sealing surfaces 12a and 15a surrounding the bores 12 and 15 in the end wall of cylinder 1 are tightly engaged in sealing contact with the sealing ring members S which define and surround the ports 53 and 54, respectively, at the inner side of the end panel wall 33, while the annular metal sealing surfaces 18a and 20a which surround the ports 18 and 20 in the side walls of the cylinders 1 and 2 are tightly engaged in sealing contact with the sealing ring members S which define and surround the ports 44 and 45, respectively, in the inner side of the side panel wall 30 of the mounting structure M. As hereinbefore explained, the sealing ring members S are compressible but under the forces applied by the clamping members C necessary to effect leakproof, bubble-tight sealing with the metal surfaces which they respectively engage such sealing ring members are only compressed a matter of a few thousandths of an inch, so that in the clamped, sealed position of the valve unit V on the mounting structure M, the only areas of contact between the valve unit and the mounting structure at the inner sides of the panel walls of the latter are provided by the engaged sealing members and metal sealing surfaces of the valve unit. Except for these areas of contact the surfaces of the walls of the valve unit V opposite and facing the inner surfaces of the panel walls 30 and 33 of the mounting structure M are spaced apart and separated. These areas of sealing contact are separate from and independent of each other and thus provide for effective self-adjustment in the event that either initially or after a period of operation and use there happen to be differences in the thickness of the sealing ring members S or in their degree of compression or compressibility under the forces which are applied by the clamping members C to attach and clamp the valve unit V to the mounting structure M. We have demonstrated in tests and under actual working conditions that by the foregoing arrangement, leakproof, bubble-tight sealing is obtained even with pressures up to the order of 600 pounds p.s.i. and that such effective sealing can be obtained by the use of relatively low or minimum pressures to force the valve unit V and mounting structure M together in port sealing connection. Thus, the use of the camming-type quick release clamping members is made possible with the advantages and efficient results as referred to herein.

The valve unit V may be very quickly released and removed from mounted position on a mounting structure M by merely unscrewing and loosening up on the cap screws 65 to thus release the clamping members C from their clamping positions engaged with the respective camming surfaces on the casing 10 of the valve unit. With the valve unit removed a new unit may be as quickly replaced and secured in rigid attached position on the mounting structure M. It is understood, of course, that in the normal installation the mounting structure M is mounted on a suitable bracket or the like and the pipe lines or connections (not shown) to and from the pressure fluid supply system are permanently connected in the inlet and exhaust passages 55 and 56, while the pipe lines between the pressure fluid actuated component, such as a double-acting cylinder and piston unit, are permanently connected into the tapped bores of the inlet-outlet passages through the panel wall 30. In this manner a valve unit V may be mounted in operative positions on and removed from the mounting structure without the necessity of disconnecting any of the pipe lines from or re-connecting them to the supply system to the valve unit and between the valve unit and the component to be operated thereby. It is to be further noted that by the arrangement and construction, as disclosed by the example hereof, no complicated cored bases are required as the inlet and exhaust passages to the cylinder 1 and the inlet-outlet passages to the cylinders 1 and 2 are both formed as straight line passages through the panel walls 33 and 30 of the mounting structure and through the side walls of the casing 10. Thus, the mounting structure is rendered compact and utilizes a minimum of material with reduced costs to manufacture and increased efficiency in operation and results.

The preferred form of our invention, as disclosed in Fig. 1, as described above, may be aptly referred to as of a "wrap-around" type in that it provides panel walls presenting ported inner surface portions thereof which are angularly related. In another expression of a modified form of the invention as disclosed in Figs. 9 and 10, the ported portions of the inner surfaces of the panel walls of the mounting structure are presented in the same or, if desired, in offset but substantially parallel planes, by a single, straight-line wall or walls. Such modified form of mounting structure thus locates all of the panel wall ports at one side of the valve unit to be clamped and rigidly secured thereto and hence requires a valve unit in which all of the ports therefrom and thereto to be connected with the ports of the mounting structure are located at one side of the valve unit.

Referring to the modified form of Figs. 9 and 10, the mounting structure M' is comprised of a single, straight panel wall 100 having across the lower side or edge thereof the transversely disposed spaced and parallel mounting pedestals 101 in a manner generally corresponding to the arrangement of panel wall 30 and pedestals 31 of the preferred form of the invention of Fig. 1. As the mounting structure M' in its normal position will be upright, the panel wall 100 will be vertically disposed, although as hereinbefore pointed out such vertical position of mounting is not essential or critical. Panel wall 100 provides at the outer side adjacent the opposite vertical ends thereof the horizontally outwardly extending bosses 102 which have tapped, horizontally disposed bores 103 extending axially therethrough to provide for coupling thereinto of the pipe lines between the valve unit to be positioned on mounting M' and a pressure fluid actuated component to be operated and controlled by the valve unit. At the inner side of panel wall 100 and offset laterally inwardly from the tapped bores 103 through the bosses 102, ports 104 are provided opening through the inner surface 105 of panel wall 100. Each tapped bore 103 in its boss 102 is placed in communication with the inwardly offset port 104 adjacent thereto by a flow passage 106 extending therebetween.

Passages 107 and 108 are formed extending transversely through panel wall 100 in positions spaced apart along the vertical or longitudinal center line of the panel wall with passage 107 being located adjacent the outer or upper end and passage 108 being located adjacent the lower end of the wall in position spaced a distance inwardly from the mounting pedestals 101. Passage 107 provides an inlet flow passage for a pressure fluid valve unit to be clamped on mounting structure M'. Passage 107 opens through the outer side of panel wall 100 as a bore in an annular boss 107a the bore being tapped a distance into this boss for permanent connection therein of the inlet flow line to the pressure fluid supply system with which the mounting structure is to be coupled. At its inner end passage 107 terminates in an inlet port 109 which opens through the surrounding portion of the planar inner surface 105 of the panel wall. The passage 108 through panel wall 100 provides an exhaust passage for flow of pressure fluid therethrough to a valve unit clamped onto the mounting structure M' and this passage opens at its outer, intake end through an annular boss 108a with the passage tapped inwardly a distance into this boss for permanent connection therein of an exhaust pipe line from a pressure fluid supply system. The exhaust passage 108 at its inner end terminates in a port 110 which opens through the portion of the planar surface 105 at the inner side of wall 100 which surrounds such port.

The panel wall 100 at its outer or upper end is provided with the laterally disposed, spaced flanges 111 which extend therefrom at substantially right angles thereto at the outer side thereof adjacent the opposite vertical or outer side edges, respectively, of the panel wall. Each of these flanges 111 at its outer free edge is formed with a recess 112 across the outer or upper side thereof with each of these recesses at its inner side providing an anchor shoulder 114 transversely across the flange.

The pressure fluid valve unit V' of the four-way type adapted for clamping in rigid operative position on the mounting structure M', is generally similar to the valve unit V hereinabove described, and includes a body or casing 10' which provides the valve member receiving cylinders, such as the cylinders 1 and 2 of valve unit V. However, valve unit V' provides and locates all of its pressure fluid ports for connection with the pressure fluid supply system and for connection with the component to be operated thereby, at and spaced on one side of the casing 10' for sealing connection with the corresponding ports through the straight-line panel wall 100 of mounting structure M'.

The casing 10' of valve unit V' has a block 115 formed thereon standing thereacross spaced below but adjacent the upper side of the casing, block 115 being preferably cast or formed integrally with the casing. The block 115 is provided across its upper edge with a dovetail groove 125 which provides at the forward side thereof an upwardly extending lip or flange 126 having an outwardly and upwardly inclined surface 127 on the inner or groove side thereof providing an outer edge 127' therealong. A generally similar block 116 is provided extending on and across the casing 10' at the lower end thereof below and generally parallel with block 115. A dovetail groove 128 is formed in and across the lower or underside of block 116 and forms at its forward side a downwardly extending lip or flange 129 having a downwardly and forwardly inclined wedging and camming surface 130 at the inner or groove side thereof.

The side of the casing 10' on which the blocks 115 and 116 are provided, is formed with four (4) passages extending transversely or radially therethrough positioned spaced apart at locations thereon such that the outer open, port forming ends thereof will align with the ports 104, 109 and 110, respectively, at the inner side of panel wall 100 when the valve unit V' is in mounted position on and clamped to the mounting structure M'. These passages and ports are generally identical with the passages 17 and 19 with the ports 18 and 20 through the side wall of the valve unit casing 10 of the preferred form of the invention of Fig. 1, hence it is not deemed necessary to make a detailed disclosure thereof in connection with this modified form. Each of these passages, one of which is indicated by dotted line as passage 117 in Fig. 9, is formed through a boss 118 which projects from the outer side of casing 10' with the passage opening as the port 119 in the outer end of the boss.

The outer end of each passage 117 in its boss 118 is counterbored to provide the annular recess 117a for receiving therein a sealing ring member S' similar to the sealing ring member S hereinbefore described and explained in the form of our invention of Fig. 1.

The portions of the panel wall 100 at and across the mounting pedestals or bases 101 at the side of the wall at which the valve unit V' is mounted, are formed of increased thickness and the upper sides of these increased thickness portions are provided with the transversely aligned dovetail grooves 131 thereacross open at the upper sides thereof. Such dovetail grooves provide upwardly extending lips or flanges 132 across the outer sides thereof with the inner sides of these flanges forming upwardly and outwardly inclined surfaces 133 on the inner or groove sides thereof.

The valve unit V' is mounted in operative position on the mounting structure M' with the upwardly extending flanges 132 of the dovetail groove portions across the pedestals 101 of the mounting structure M' received and seated in the dovetail groove 128 of the block 116 across the lower side of the valve unit casing 10'. Thus mounted and positioned, the camming surface 130 provided by dovetail groove 128 is seated on the camming surfaces 133 of dovetail grooves 131 in camming relation therewith and the annular sealing surfaces provided by the sealing ring members S' surrounding the ports 119 of the casing 10' are aligned with the ports 104, 104, 108 and 110, respectively, in engagement with the annular portions of the inner surface 105 of panel wall 100, which surround and define the latter ports.

Clamping members C, identical with the clamping members of the form of the invention of Fig. 1, are normally permanently mounted on and across the upper sides of the flanges 111 at the upper end of panel wall 100 of the mounting structure M'. The anchor flanges 61 of the clamping members C are received in the recesses 112 of flanges 111 in engagement against the anchor shoulders 114. Each clamping member C, there being two (2) of such members in this instance, is operatively mounted in the above described positions by a cap screw 65 which is threaded downwardly into a suitable tapped bore in the upper side of the flange 111 on which the clamping member is mounted so that the head of the cap screw may be engaged against the outer side of the body or bar 60 of the clamping member. In such mounted positions of the clamping members C the camming flanges 62 thereof extend down into the groove 125 across the upper side of the block 115 on the casing 10' in camming engagement with the edge 127' formed along such dovetail groove.

The valve unit V' so mounted and positioned on the mounting structure M' may then be securely, rigidly clamped into its final operative position by merely tightening up on the cap screws 65 and thus camming the flanges 62 of the clamping members C into engagement with the edge surface 127' to thus draw and cam the valve unit V' through the cooperative wedging action between the surfaces 130 and 133 provided by the dovetail grooves 128 and 131 across the lower sides of the panel wall 100 and the casing 10' of the valve unit V'. With the valve unit V' so cammed against the inner side of the panel wall 100 the ports 119 of the valve unit will be mated and placed in sealed communication with the ports 104, 104, 108 and 110, respectively, at the inner side of panel wall 100. As hereinbefore explained in connection with the preferred form of the invention of Fig. 1, the valve unit V' may be very quickly attached and clamped into operative position by merely tightening up on the cap screws 65 and just as rapidly unclamped and released for removal and replacement by another unit by merely loosening the cap screw 65 to release the clamping members C.

It will also be evident that various other modifications, embodiments, variations, constructions, arrangements and combinations may be resorted to without departing from the broad spirit and scope of our invention, and hence we do not desire to limit our invention in all respects to the exact and specific disclosures hereof, except as may be required by specific and intended limitation thereto appearing in any of the claims hereto appended.

What we claim is:

1. In combination, a mounting structure including an attachment base having a side panel wall thereon and an end panel wall extending laterally from one end of said side panel wall; said panel walls being substantially normal to the general plane of said attachment base; said side panel wall having ports therein opening through the inner side thereof; said end panel wall having ports therein opening through the inner side thereof; a casing unit having opposite side and opposite end walls; one side wall of said casing unit having ports therein opening through the outer side thereof; one end wall of said casing unit having ports therein opening through the outer side thereof; said casing unit being mounted on said mounting structure with the ported side wall and ported end wall thereof opposite and facing the inner sides, respectively, of said panel walls with the ports of said casing unit side wall being aligned and in communication with the ports in said side wall panel and the ports of said casing unit end wall being in alignment and communication with the ports in said end panel wall; a clamping member mounted on the end of said side panel wall opposite said end panel wall and extending transversely thereacross to said casing unit; a clamping member mounted on the outer end of said end panel wall in position extending transversely thereacross for engagement at its inner end with said casing unit; and means operatively engaged with each of said clamping members for releasably forcing the inner end of a clamping member into clamping engagement with said casing unit to rigidly releasably attach and secure said unit in mounted position on said mounting structure.

2. In combination, a mounting structure including an attachment base having a side panel wall thereon having an edge portion and an end panel wall extending laterally from one end of said side panel wall; said end panel wall having an edge portion; said side and end panel walls providing inner side surfaces thereon, respectively; a casing unit having an outer side and outer end wall providing side surfaces thereon, respectively; said casing unit being removably mounted on said mounting structure with said inner side surfaces of said side panel wall and said end panel wall thereof opposite and facing the outer side surfaces, respectively, of said outer side and end wall, of said casing unit; a first clamping member on said side panel wall in position extending transversely across said edge portion thereof to said casing unit; means loosely mounting said first clamping member in position on said casing unit for limited movements bodily laterally of said clamping member in its entirety toward said side panel wall and in its entirety from said side panel wall; a second clamping member on said end panel wall in position extending transversely across said edge portion thereof to said casing unit; means loosely mounting said second clamping member in position on said end panel wall for movements bodily laterally in its entirety toward said end panel wall and in its entirety from said end panel wall; the ends of said first and second clamping members having camming surfaces thereon in camming engagement with said casing unit; and quick releasable means operatively engaged with each of said first and said second clamping members for releasably forcing said clamping members bodily inwardly in their entireties toward said side and end panel walls and said casing unit with said camming surfaces of said clamping members in camming engagement with said casing unit to cam said unit inwardly toward said mounting structure into rigidly clamped and secured position on and against said side panel wall and said end panel wall of said mounting structure.

References Cited in the file of this patent

UNITED STATES PATENTS

| | | |
|---|---|---|
| 194,575 | Burden | Aug. 28, 1877 |
| 222,869 | Clark | Dec. 23, 1879 |
| 335,404 | Walsh | Feb. 2, 1886 |
| 569,801 | Post | Oct. 20, 1896 |
| 707,988 | Trethewey | Aug. 26, 1902 |
| 1,016,878 | Felker | Feb. 16, 1912 |
| 1,173,061 | Treglou | Feb. 22, 1916 |
| 1,207,324 | Poque | Dec. 5, 1916 |
| 1,312,617 | Danielson | Aug. 12, 1919 |
| 1,581,064 | Kelly | Apr. 13, 1926 |
| 2,085,574 | Chaddler | June 29, 1937 |
| 2,195,547 | Vickers et al. | Apr. 2, 1940 |
| 2,222,095 | Van Dusen | Nov. 19, 1940 |
| 2,249,188 | Stevenson | July 5, 1941 |
| 2,439,073 | Butterfield | Apr. 6, 1948 |
| 2,603,380 | Hornbostel | July 15, 1952 |
| 2,761,703 | Olwin | Sept. 4, 1956 |
| 2,832,495 | Batts | Apr. 29, 1958 |

FOREIGN PATENTS

| | | |
|---|---|---|
| 663,975 | Great Britain | Jan. 2, 1952 |